United States Patent
Fujii et al.

(10) Patent No.: US 8,664,155 B2
(45) Date of Patent: Mar. 4, 2014

(54) CARBON MATERIAL FOR ELECTRIC DOUBLE LAYER CAPACITOR AND PROCESS FOR PRODUCING THE CARBON MATERIAL

(75) Inventors: Masaki Fujii, Kawasaki (JP); Shinya Taguchi, Kawasaki (JP); Yutaka Sanokawa, Kawasaki (JP); Keizo Ikai, Kawasaki (JP)

(73) Assignee: JX Nippon Oil & Energy Corporation, Tokyo (JP)

( * ) Notice: Subject to any disclaimer, the term of this patent is extended or adjusted under 35 U.S.C. 154(b) by 327 days.

(21) Appl. No.: 13/063,478

(22) PCT Filed: Sep. 11, 2009

(86) PCT No.: PCT/JP2009/004517
§ 371 (c)(1),
(2), (4) Date: Mar. 11, 2011

(87) PCT Pub. No.: WO2010/032407
PCT Pub. Date: Mar. 25, 2010

(65) Prior Publication Data
US 2011/0160038 A1 Jun. 30, 2011

(30) Foreign Application Priority Data
Sep. 16, 2008 (JP) ................... 2008-236632

(51) Int. Cl.
*C01B 31/10* (2006.01)
(52) U.S. Cl.
USPC ......................................... 502/433
(58) Field of Classification Search
USPC ......................................... 502/433
See application file for complete search history.

(56) References Cited

U.S. PATENT DOCUMENTS

| | | | | |
|---|---|---|---|---|
| 4,529,717 A | * | 7/1985 | Loutfy et al. | 502/433 |
| 5,877,935 A | * | 3/1999 | Sato et al. | 361/502 |
| 7,666,306 B2 | * | 2/2010 | Fukuda et al. | 210/660 |
| 2005/0047061 A1 | | 3/2005 | Sugo et al. | |

FOREIGN PATENT DOCUMENTS

| | | |
|---|---|---|
| JP | 63078513 A | 4/1988 |
| JP | 10-199767 A | 7/1998 |
| JP | 2000-138140 A | 5/2000 |
| JP | 2001-180923 A | 7/2001 |
| JP | 2002-104817 A | 4/2002 |
| JP | 2003-171105 A | 6/2003 |
| JP | 2003-282369 A | 10/2003 |
| JP | 2004-182506 A | 7/2004 |
| JP | 2007-115749 A | 5/2007 |

OTHER PUBLICATIONS

Int'l. Search Report issued on Dec. 22, 2009 in In'tl. Application No. PCT/JP2009/004517.

* cited by examiner

*Primary Examiner* — Stuart Hendrickson
(74) *Attorney, Agent, or Firm* — Panitch Schwarze Belisario & Nadel LLP

(57) ABSTRACT

The present invention provides a process for producing an activated carbon having a small average particle diameter, a uniform particle size and a relatively large specific surface area suitable for an electric double layer capacitor electrode, in an easy and cost effective manner. The process comprises calcining an easily graphitizable carbon material such as petroleum coke or coal coke, used as the raw material under an oxidizing gas atmosphere, adjusting the particle size of the carbon material, and then activating the carbon material. The use of the activated carbon produced by the process of the present invention in an electrode can provide an electric double layer capacitor having a large capacitance per unit volume.

5 Claims, No Drawings

CARBON MATERIAL FOR ELECTRIC DOUBLE LAYER CAPACITOR AND PROCESS FOR PRODUCING THE CARBON MATERIAL

CROSS-REFERENCE TO RELATED APPLICATION

This application is a Section 371 of International Application No. PCT/JP2009/004517, filed Sep. 11, 2009, which was published in the Japanese language on Mar. 25, 2010, under International Publication No. WO 2010/032407 A1, and the disclosure of which is incorporated herein by reference.

TECHNICAL FIELD

The present invention relates to an activated carbon, which is a carbon material for an electric double layer capacitor electrode and a process for producing such carbon material.

BACKGROUND ART

Activated carbon is made from carbon materials such as carbonized coconut shell, petroleum coke or coal coke that is activated to have a porous structure. The activated carbon that is porous and thus has a large surface area has been widely used as an absorbent, a catalyst support, and an electrode material for double layer capacitors and lithium secondary batteries. In particular, in order to increase the energy density, i.e., capacitance in an electric double layer capacitor, which is used in a hybrid car or the like, an activated carbon having effectively formed fine pores, a high crystallinity and a large surface area has been demanded to be used as an electrode material for the capacitor.

For industrial production of such an activated carbon with effectively formed fine pores that can be used as an electrode material of an electric double layer capacitor, an activation method has been generally used, in which a carbon material such as petroleum coke and an alkali metal compound such as potassium hydroxide are heated at a temperature of 600 to 1200° C. in an inert gas atmosphere to allow the alkali metal to ingress between and react with graphite crystal layers. In this activation, the alkali metal enters the layered structure wherein condensed polycyclic hydrocarbons are layered, as the result fine pores are formed.

The activated carbon that is used for production of an electric double layer capacitor electrode is required to have a relatively large surface area, a small average particle diameter, and a uniform particle size, and contain no bulky particles.

For example, in a process for producing the foregoing activated carbon as described in Patent Document 1, a carbon precursor such as coke is heated in the presence of oxygen so as to be oxygen-crosslinked and further calcined after addition of an inorganic salt thermal reaction auxiliary agent such as zinc chloride and a phosphoric acid salt to create micro pores thereby producing a carbon material for an electric double layer capacitor electrode. Patent document 2 proposes a process for producing a carbon material for an electric double layer capacitor electrode wherein petroleum green coke is subjected to a first calcination at a temperature range of 600 to 900° C. and then cooled to a temperature of 100° C. or lower and thereafter a second calcination at a temperature higher which is 100° C. higher than the first calcination temperature is carried out thereby producing a carbonized product, which is then activated with an alkali metal hydroxide.

However, the activated carbon for an electric double layer capacitor electrode is required to be small in average particle diameter and uniform in particle size, and contain no bulky particles. In view of such requirements, the foregoing processes are still insufficient and have been demanded to be further improved.

PRIOR ART DOCUMENTS

Patent Documents

Patent Document 1: Japanese Patent Application Laid-Open Publication No. 2003-282369
Patent Document 2: Japanese Patent Application Laid-Open Publication No. 2007-115749

DISCLOSURE OF INVENTION

Technical Problem

Examples of methods of making the particle size of activated carbon smaller include those wherein activated carbon is ground down to an intended particle size and wherein the fine raw material is activated to produce activated carbon. The former method is not preferable because fine pores are crushed, resulting in a smaller surface area while the latter method has a problem that particles fuse to each other during the activation and thus the particle size of the resulting activated carbon becomes larger than that of the raw material. The present invention was accomplished on the basis of the finding of the inventors of the present invention that when an easily graphitizable carbon material is used as the raw material, the particles thereof can be inhibited from fusing to each other and increasing in particle size caused by activation, by calcining the raw material under an oxidizing gas atmosphere and then adjusting the particle size thereof, resulting in an activated carbon that has a relatively large surface area and a small average particle diameter, and is free of bulky particles and uniform in particle size.

Solution to Problem

That is, the present invention relates to a process for producing an activated carbon for an electric double layer capacitor electrode, comprising calcining an easily graphitizable carbon material used as the raw material under an oxidizing gas atmosphere, activating the carbon material, and then adjusting the particle size of the carbon material.

The present invention also relates to the foregoing process wherein the oxidizing gas is air.

The present invention also relates to the foregoing process wherein the calcination temperature is from 500 to 700° C.

The present invention also relates to the foregoing process wherein the carbon material produced by calcining an easily graphitizable carbon material under an oxidizing gas atmosphere is adjusted to have an average particle diameter of 0.5 to 8 μm.

The present invention also relates to an activated carbon for an electric double layer capacitor electrode produced by any one of the foregoing processes.

Advantageous Effects of Invention

The present invention can produce an activated carbon for an electric double layer capacitor electrode that is small in average particle diameter, uniform in particle size, and relatively large in specific surface area, in an easy and cost effective manner. The use of the activated carbon produced by the process of the present invention in an electrode can provide an electric double layer capacitor having a large capacitance per unit volume.

DESCRIPTION OF EMBODIMENT

The present invention will be described in detail below.

Examples of the easily graphitizable carbon material used as the starting material in the present invention include petroleum coke and coal coke. The easily graphitizable carbon material may also be infusibilized and carbonized mesophase pitch and infusibilized and carbonized mesophase carbon fiber produced by spinning mesophase pitch. Petroleum coke is preferably used, and petroleum green coke is particularly preferably used.

Petroleum green coke, which is preferably used as the starting material in the present invention is an aggregate where polycyclic aromatic compounds having an alkyl side chain are layered and a solid that is not fusible by heat.

The petroleum coke is a product containing mainly solid carbon produced by cracking (coking) thermally a heavy fraction of petroleum at a high temperature on the order of 500° C. and is referred to as petroleum coke to be differentiated from ordinary coal-based coke. There are petroleum coke produced by delayed coking and petroleum coke produced by fluid coking. Currently, the former constitutes the majority. In the present invention, petroleum green coke (green coke) remaining as it is taken out from a coker is preferably used. The green coke produced by delayed coking contains 6 to 13 percent by mass of a volatile component while the green coke produced by fluid coking contains 4 to 7 percent by mass of a volatile component. In the present invention, the green coke produced by either one of the methods may be used. However, the green coke produced by delayed coking is particularly suitable in view of easy availability and stable quality.

No particular limitation is imposed on the heavy fraction of petroleum. Examples of the heavy fraction include heavy oil that is a residue produced when petroleums are vacuum-distilled, heavy oil produced by fluid catalytic cracking petroleums, heavy oil produced by hydrodesulfurizing petroleums, and mixtures thereof.

In the present invention, the above-described easily graphitizable carbon material is calcined under an oxidizing gas atmosphere, and then the resulting carbonized material is adjusted in particle size and thereafter is activated in the coexistence of an alkali metal hydroxide.

Examples of the oxidizing gas include air, oxygen, ozone, nitrogen monoxide, steam, and chlorine. Air or oxygen is preferably used, and air is particularly preferably used. Upon calcination, the oxidizing gas is usually used as a mixture with an inert gas such as nitrogen.

The calcination temperature that is one of the conditions of the calcination under an oxidizing gas atmosphere is preferably from 500 to 700° C., more preferably from 520 to 680° C. A calcination temperature of lower than 500° C. leads to an insufficient oxidization reaction while a calcination temperature of higher than 700° C. causes the carbonizing reaction to proceed too much. No particular limitation is imposed on the calcination time. However, once the intended temperature is reached, it is preferably kept for 10 minutes to 2 hours.

The oxidization conditions by an oxidizing gas upon calcination vary depending on the oxidizing power thereof and can be suitably selected depending on how much the material is oxidized after being calcined. Specifically, the increased amount of oxygen by oxidization is within the range of preferably 0.5 to 10 percent by mass, more preferably 2 to 5 percent by mass. An increase in the amount of oxygen of less than 0.5 percent by mass leads to a less oxidizing effect while an increase in the amount of oxygen of more than 10 percent by mass leads to a large weight loss.

The carbonized material thus produced by calcination under an oxidizing gas atmosphere is adjusted in particle size and then activated. The carbonized material is adjusted in particle size so as to have an average particle diameter of 0.5 to 8 μm, preferably 1 to 7 μm. A particle diameter of the carbonized material of smaller than 0.5 μm involves fusion of particles causing an increase in the particle diameter. A particle diameter of the carbonized material of larger than 8 μm leads to an activated carbon having a particle diameter larger than the intended diameter.

No particular limitation is imposed on the method of adjusting the particle diameter of the carbonized material. However, a method may be used wherein the material is crushed with crushing means such as a jet mill.

Thereafter, the carbonized material adjusted in particle diameter is activated using an alkali metal hydroxide.

No particular limitation is imposed on the reaction conditions for the activation as long as the reaction is allowed to proceed sufficiently. Accordingly, the activation reaction may be carried out under conditions that are the same as those for known activation reactions carried out for the production of conventional activated carbon. For example, the activation reaction in the activation step may be carried out by mixing an alkali metal hydroxide with the carbonized material having been calcined as done in the production of a conventional activated carbon and heating the mixture under high temperature conditions where the temperature is preferably 400° C. or higher, more preferably 600° C. or higher, more preferably 700° C. or higher. No particular limitation is imposed on the upper limit of this heating temperature if the activation reaction proceeds without any trouble. However, the upper limit is preferably 900° C. or lower.

Examples of the alkali metal hydroxide used in the activation reaction include KOH, NaOH, RbOH, and CsOH. Particularly preferred is KOH in view of activation efficiency.

The activation treatment is usually carried out by mixing an activation agent such as an alkali metal hydroxide with a carbon material (carbonized product) and heating the mixture. No particular limitation is imposed on the mix ratio of the carbonized product and the activation agent. However, the mass ratio of the both (carbonized product:activation agent) is within the range of preferably 1:0.5 to 1:5, more preferably 1:1 to 1:3.

The activated product resulting from the activation reaction is then washed. A method of washing the activated product is preferably a method wherein the activated product is washed with a washing liquid and solid-liquid separation is carried out. For example, a method may be employed, wherein the activated product is immersed in a washing liquid and if necessary stirred and heated so as to be mixed therewith, and the washing liquid is removed.

The washing liquid is preferably water or an acid aqueous solution. For example, any combination such as washing with water, washing with an acid aqueous solution, and washing with water may be used.

Examples of the acid aqueous solution include halogenated hydracids such as hydrochloric acid, hydriodic acid, and hydrobromic acid, and inorganic acids such as sulfuric acid and carbonic acid. The concentration of the acid aqueous solution may be from 0.01 to 3 N. Washing with these washing liquids may be repeated more than once if necessary.

No particular limitation is imposed on the amount of the alkali metal remaining in the carbonized product after washing if the amount is lower than such a level (preferably 1000 ppm by mass or less) that possibly adversely affects the resulting electric double layer capacitor. However, for example, the carbonized product is preferably washed so that the pH of the detergent drain is from 7 to 8 and washed so that the alkali metal is removed as much as possible. After washing, the carbonized product undergoes a drying step that is conventionally carried out, thereby producing the intended activated carbon.

The activated carbon produced by the present invention has an average particle diameter of 0.5 to 7 µm and a specific surface area of 1500 to 2500 $m^2/g$. Further, the pore volume of the pores with a diameter of 0.1 to 50 nm in the activated carbon, determined by a nitrogen gas absorption method is from 0.1 to 3 ml/g while the pore volume of the pores with a diameter of 0.05 to 300 in the activated carbon, determined by mercury intrusion technique is from 0.4 to 5 ml/g. The remaining alkali metal content is 200 ppm by mass or less.

Next, description will be given of the electric double layer capacitor of the present invention.

The electric double layer capacitor of the present invention is characterized in that it is provided with electrodes containing an activated carbon prepared as described above.

The electrodes is configured with the activated carbon and a binder and preferably in addition an electric conductive agent and may be electrodes that are integrated with a collector.

The binder used herein may be any conventional one. Examples of the binder include polyolefins such as polyethylene and polypropylene, fluorinated polymers such as polytetrafluoroethylene, polyvinylidene fluoride and fluoroolefin/vinylether cross-linked copolymers, celluloses such as carboxylmethyl cellulose, vinyl polymers such as polyvinylpyrrolidone and polyvinyl alcohol, and polyacrylic acids. No particular limitation is imposed on the content of the binder in the electrode. The content is usually selected within the range of 0.1 to 30 percent by mass on the basis of the total amount of the activated carbon and the binder.

The electric conductive agent may be a powdery material such as carbon black, powder graphite, titanium oxide and ruthenium oxide. The blend amount of the electric conductive material in the electrode is suitably selected depending on the purposes of blending. The blend amount is usually selected within the range of usually 1 to 50 percent by mass, preferably from 2 to 30 percent by mass on the basis of the total amount of the activated carbon, binder and electric conductive agent.

The activated carbon, binder and electric conductive agent may be mixed by a conventional method. For example, a method may be employed, wherein a solvent that dissolves the binder is added to these components to prepare slurry, which is then applied evenly on a collector or wherein these components are kneaded without adding such a solvent and pressed at ordinary temperature or while being heated.

The collector may be any of those of conventional materials with conventional shapes. Examples of the material include metals such as aluminum, titanium, tantalum, and nickel and alloys such as stainless.

The unit cell of the electric double layer capacitor of the present invention is formed by placing a pair of the above-described electrodes used as an anode and a cathode to face each other via a separator (polypropylene fiber nonwoven fabric, glass fiber fabric or synthetic cellulose paper) and then immersing the electrodes into an electrolytic solution.

The electrolytic solution may be any of aqueous or organic electrolytic solutions known in the art. However, organic electrolytic solutions are preferably used. Examples of such organic electrolytic solutions include those used for electrochemical electrolytic solutions such as propylene carbonate, ethylene carbonate, butylene carbonate, γ-butyrolactone, sulfolane, sulfolane derivatives, 3-methylsulfolane, 1,2-dimethoxyethane, acetonitrile, glutaronitrile, valeronitrile, dimethylformamide, dimethylsulfoxide, tetrahydrofuran, dimethoxyethane, methyl formate, dimethyl carbonate, diethyl carbonate, and ethyl methyl carbonate. Note that these electrolytic solutions may be used in combination.

No particular limitation is imposed on the supporting electrolyte in the organic electrolytic solution. Therefore, the supporting electrolyte may be any of various salts, acids, and alkalis that are generally used in the electrochemical field or the battery field. Examples of such a supporting electrolyte include inorganic ionic salts such as alkali metal salts and alkaline earth metal salts, quaternary ammonium salts, cyclic quaternary ammonium salts, and quaternary phosphonium salts. Preferable examples include $(C_2H_5)_4NBF_4$, $(C_2H_5)_3(CH_3)NBF_4$, $(C_2H_5)_4PBF_4$, $(C_2H_5)_3(CH_3)PBF_4$. The concentrations of such salts in electrolytic solutions are properly selected from the range of usually 0.1 to 5 mol/l, preferably 0.5 to 3 mol/l.

No particular limitation is imposed on the more specific configuration of the electric double layer capacitor. However, example of the configuration include a coin type accommodating a pair of electrodes (positive and negative electrodes) in the form of sheet or disc with a thickness of 10 to 500 µm and a separator sandwiched between the electrodes, in a metal case, a wound type comprising a pair or electrodes and a separator disposed therebetween, all of which are wound, and a layered type comprising electrodes stacked via separators.

EXAMPLES

The present invention will be described in more details with reference to the following examples but is not limited thereto.

Example 1

Physical properties of the petroleum green coke that was used as the raw material are set forth in Table 1.

The green coke was calcined at a temperature of 530° C. under an atmosphere where the flow volume ratio of nitrogen gas to air was 50:50 for one hour. Thereupon, the temperature rise rate was 200° C./hour. Physical properties of the carbonized product resulting from the calcination are set forth in Table 1. The carbonized product was crushed with a jet mill, and the resulting average particle diameter (D50) was 6.5 µm. Potassium hydroxide was admixed to the crushed product so that the amount of potassium hydroxide was 220 parts by mass on the basis of 100 parts by mass of the crushed product and then activated at a temperature of 700° C. under an nitrogen gas atmosphere for one hour. After the reaction, the reaction mixture was placed into water and the resulting slurry was repeatedly washed with water and acid (using hydrochloric acid) to remove the remaining potassium and then dried thereby producing activated carbon. The specific surface area of the resulting activated carbon determined in the following manner was 2220 $m^2/g$, and the average particle diameter was 6.9 µm. Properties such as particle size distribution are set forth in Table 2.

Each analysis was conducted as follows.

Hydrogen/carbon atomic ratio: calculated by determining the carbon weight percent and hydrogen weight percent in a sample using an organic element analyzer (NCH-22F manufactured by Sumika Chemical Analysis Service, Ltd)

Volatile component: measured in accordance with the method of JIS M8812 "Coal and coke-Methods for proximate analysis"

True density: measured in accordance with JIS K2151

Specific surface area/Pore volume: measured by the nitrogen gas adsorption method (BET method)

Particle size distribution: measured using a laser diffraction particle size analyzer (LA-950 manufactured by HORIBA, Ltd.) after adding a small amount of surfactant containing water as dispersant and irradiating ultrasonic wave to a sample. From the resulting particle size integral curve on the basis of the volume, 10% particle size, 50% particle size (average particle size) and 90% particle size were determined.

To 80 parts by mass of the activated carbon produced above were added 10 parts by mass of carbon black and 10 parts by mass of polytetrafluoroethylene powder. The mixture was kneaded in a mortar until it turned into paste. Then, the resulting paste was rolled using a roller press at 180 kPa to prepare an electrode sheet having a thickness of 300 μm.

Two discs each having a diameter of 16 mm were punched out from the electrode sheet, and then vacuum dried at a temperature of 120° C. at 13.3 Pa (0.1 Torr) for two hours. Thereafter, the disc-like electrodes were vacuum impregnated with an organic electrolytic solution (a propylene carbonate solution of triethylmethylammonium tetrafluoroborate, concentration: 1 mol/l) in a glove box under a nitrogen atmosphere with a dew point of −85° C. Then, the two sheets of electrodes were used as positive and negative electrodes, respectively, and a cellulose separator (manufactured by NIPPON KODOSHI CORPORATION, trade name: TF40-50, thickness: 50 μm) was interposed between the electrodes. Collectors of aluminum foils were attached to the both ends of the electrodes, and then electrodes were incorporated into a bipolar cell manufactured by Hosen Corporation to prepare an electric double layer capacitor (coin type cell). The capacitance of the resulting capacitor was measured by the following method. The results are set forth in Table 3.

Capacitance: The coin type cell was charged up to 2.7 V with a constant current of 2 mA per 1 F. After the charging was completed, the cell was maintained at 2.7 V for 30 minutes and then discharged at a constant current of 1 mA at a temperature of 20° C. In a discharging curve where 80% of the charged voltage is defined as V1, 40% of the charged voltage is defined as V2, the time that the voltage takes for decreasing from 80% to 40% is defined as ΔT, and a discharging current value is defined as I, capacitance C[F] is calculated by the following formula:

Capacitance $C[F]=I\Delta T/(V1-V2)$.

The capacitance is divided by the weight of activated carbon contained in the electrodes (the total weight of positive and negative electrodes), from which the capacitance [F/g] per weight is derived. This F/g was multiplied by electrode density [g/cc] to calculate F/cc.

Example 2

The same raw material green coke as that used in Example 1 was calcined at a temperature of 630° C. for one hour. The temperature rising rate and atmosphere gas were the same as those of Example 1.

Physical properties of the carbonized product resulting from the calcination are set forth in Table 1. The carbonized product was crushed with a jet mill and the resulting average particle diameter (D50) was 5.9 μm. The resulting crushed product was activated with the same procedures as those of Example 1. After the reaction, the reaction mixture was placed into water and the resulting slurry was repeatedly washed with water and acid (using hydrochloric acid) to remove the remaining potassium and then dried thereby producing activated carbon. The specific surface area was 1580 m$^2$/g, and the average particle diameter determined by particle size distribution was 6.0 μm. Properties such as particle size distribution are set forth in Table 2.

An electric double layer capacitor (coin type cell) was prepared using the resulting activated carbon in the same manner as that in Example 1, and the capacitance was measured. The result is set forth in Table 3.

Comparative Example 1

The same raw material green coke as that used in Example 1 was calcined at a temperature of 530° C. under a nitrogen gas atmosphere for one hour. The temperature rising rate was the same as that of Example 1.

Physical properties of the carbonized product resulting from the calcination are set forth in Table 1. The carbonized product was crushed with a jet mill and the resulting average particle diameter (D50) was 6.8 μm. The resulting crushed product was activated, washed and dried with the same procedures of Example 1. The specific surface area was 2320 m$^2$/g, and the average particle diameter was 10.1 μm. Properties such as particle size distribution are set forth in Table 2.

An electric double layer capacitor (coin type cell) was prepared using the resulting activated carbon in the same manner as that in Example 1, and the capacitance was measured. The result is set forth in Table 3.

Comparative Example 2

The same raw material green coke as that used in Example 1 was calcined at a temperature of 630° C. under a nitrogen gas atmosphere for one hour. The temperature rising rate was the same as that of Example 1.

Physical properties of the carbonized product resulting from the calcination are set forth in Table 1. The carbonized product was crushed with a jet mill and the resulting average particle diameter (D50) was 6.2 μm. The resulting crushed product was activated, washed and dried with the same procedures as those of Example 1. The specific surface area was 1620 m$^2$/g, and the average particle diameter was 9.4 μm. Properties such as particle size distribution are set forth in Table 2.

An electric double layer capacitor (coin type cell) was prepared using the resulting activated carbon in the same manner as that in Example 1, and the capacitance was measured. The result is set forth in Table 3.

TABLE 1

|  | Calcination Temperature °C. | Calcination Time hr | Atmosphere Nitrogen/Air Flow Rate Ratio | Oxygen Component mass % | Volatile Component mass % | True Density g/cm³ |
|---|---|---|---|---|---|---|
| Example 1 | Raw Material | | — | 0.29 | 6.7 | 1.41 |
| | 530 | 1 | 50:50 | 1.11 | 4.1 | 1.40 |
| Example 2 | 630 | 1 | 50:50 | 1.49 | 3.3 | 1.45 |

TABLE 2

| | Material Before Activation Particle Size Distribution (μm) | | | Activated Carbon | | | |
|---|---|---|---|---|---|---|---|
| | | | | Particle Size Distribution (μm) | | | Specific Surface Area |
| | D10 | D50 | D90 | D10 | D50 | D90 | m²/g |
| Example 1 | 3.9 | 6.5 | 10.6 | 4.3 | 6.9 | 10.8 | 2220 |
| Example 2 | 3.6 | 5.9 | 9.0 | 3.7 | 6.0 | 9.2 | 1580 |
| Comparative Example 1 | 4.6 | 6.8 | 10.8 | 6.4 | 10.1 | 15.1 | 2320 |

TABLE 3

| | Electrode Density g/cc | Capacitance F/g | Capacitance F/cc |
|---|---|---|---|
| Example 1 | 0.508 | 48.3 | 24.5 |
| Example 2 | 0.616 | 46.4 | 28.6 |
| Comparative Example 1 | 0.451 | 46.4 | 20.9 |
| Comparative Example 2 | 0.514 | 44.7 | 23.2 |

INDUSTRIAL APPLICABILITY

The present invention can provide an activated carbon for an electric double layer capacitor electrode that is small in average particle diameter, uniform in particle size, and relatively large in specific surface area, at ease and a lower cost.

The invention claimed is:

1. A process for producing an activated carbon for an electric double layer capacitor electrode, comprising calcining a petroleum coke used as a raw material under an oxidizing gas atmosphere so that the amount of oxygen is increased by 0.5 to 1.2 percent by mass, adjusting a particle size of the carbon material, and activating the carbon material.

2. The process according to claim 1, wherein the oxidizing gas is air.

3. The process according to claim 1, wherein the calcining is carried out at a temperature from 500 to 700° C.

4. The process according to claim 1, wherein the calcined carbon material is adjusted to have an average particle diameter of 0.5 to 8 μm.

5. The process according to claim 1, wherein the oxidizing gas atmosphere comprises a mixture of an oxidizing gas and an inert gas.

* * * * *